United States Patent [19]

Adams et al.

[11] 4,106,962
[45] Aug. 15, 1978

[54] METHOD OF FASTENING METAL PART TO PLASTIC PART

[75] Inventors: Robert Clarence Adams, St. Clairsville; James H. Sweigart, Cambridge, both of Ohio

[73] Assignee: NCR Corporation, Dayton, Ohio

[21] Appl. No.: 815,759

[22] Filed: Jul. 14, 1977

[51] Int. Cl.² .................. B29C 27/08; B32B 31/00; B06B 3/00
[52] U.S. Cl. .................. 156/73.1; 156/252; 264/23; 228/110
[58] Field of Search .......... 29/469.5; 72/327; 156/73.1, 252; 228/110; 264/23

[56] References Cited
U.S. PATENT DOCUMENTS

| | | | |
|---|---|---|---|
| 3,184,353 | 5/1965 | Balamuth et al. | 156/73.1 |
| 3,367,809 | 2/1968 | Soloff | 156/73.1 |
| 3,899,116 | 8/1975 | Mims | 228/110 |

*Primary Examiner*—Douglas J. Drummond
*Attorney, Agent, or Firm*—J. T. Cavender; Wilbert Hawk, Jr.; George J. Muckenthaler

[57] ABSTRACT

A hole is drilled in a metal plate and the plate is then dimpled around the hole after which the plate is positioned against the plastic part. An ultrasonic horn is applied to the dimple area of the plate, the energy from the horn causing the plastic around the dimple to soften and enabling the dimple to be embedded in the plastic, and the plastic material to flow through the hole and to fill the dimple to thereby lock the metal part to the plastic part.

10 Claims, 5 Drawing Figures

METHOD OF FASTENING METAL PART TO PLASTIC PART

BACKGROUND OF THE INVENTION

In the field of fastening or securing component parts, there are numerous applications in areas wherein it is impossible to fasten the parts by reason of not having sufficient working space for the fastening devices or for the required tools. There have been various ways and means for connecting parts in confined spaces, for example, the use of compression tools, high-strength adhesives, upsetting connectors and the like. There has been the requirement, in addition to the securing or fastening of two or more metal pieces or parts, that two plastic parts or a plastic and a metal part need to be secured together. With the advent of the use of plastics for the framework or the enclosures for various machines, it is still essential that certain metal components be utilized for some parts of the machines. It is also known in the art that bonding or welding of metal to plastic is entirely feasible, and that such method of securing these dissimilar materials is common practice.

Representative prior art in method and apparatus for bonding of plastic materials in U.S. Pat. No. 3,022,814, issued to A. G. Bodine on Feb. 27, 1962, which discloses sonic bonding of two thermoplastic materials, a thermoplastic material and a metal body, or two metal bodies by using the thermoplastic material as the bonding agent.

U.S. Pat. No. 3,184,353, issued to L. Balamuth et al. on May 18, 1965, discloses the fastening together of members by high-frequency vibrations, such members being two plastic members or a plastic member and a metal member.

U.S. Pat. No. 3,278,211, issued to G. Baas et al. on Oct. 11, 1966, shows a metal-to-nonmetal seal wherein the nonmetallic material fills the spaces in the metal member around a lead-in conductor.

And, U.S. Pat. No. 3,483,611, issued to L. Balamuth et al. on Dec. 16, 1969, discloses methods and apparatus for assembling parts together by ultrasonic energy, the parts being metal and metal, plastic and plastic, or metal and plastic.

SUMMARY OF THE INVENTION

The present invention relates to securing or fastening means, and more particularly, to the bonding of a metal piece to a plastic member, wherein the bonding means includes the use of ultrasonic energy.

Specifically, in the practice of the invention, a hole is drilled, punched or otherwise provided in a metal plate and the plate is then worked by way of dimpling the area surrounding the hole. The dimpled portion of the metal plate is then placed against the plastic member, and an ultrasonic horn is applied at the dimple, the energy from the horn being concentrated in the dimple whereupon the plastic material adjacent the dimple is softened to permit the dimple to be embedded in the plastic, and cause the softened plastic material to flow through the hole and to fill the dimple with plastic material to bond the metal to the plastic.

In view of the above discussion, the principal object of the present invention is to provide means for securing or bonding together two pieces or parts within a limited space.

Another object of the present invention is to provide a method of bonding two pieces made of dissimilar materials.

An additional object of the present invention is to provide a method of sonically bonding a metallic piece to a non-metallic or plastic piece.

A further object of the present invention is to provide a method of working a metal piece by forming thereof for use in bonding the metal piece to a plastic piece.

Additional advantages and features of the present invention will become apparent and fully understood from a reading of the following description taken with the annexed drawing.

DESCRIPTION OF THE PREFERRED EMBODIMENT

Figure 1:
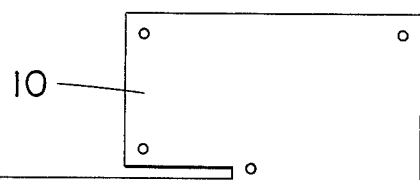
FIG. 1 is a view of a side plate member of a cabinet or the like utilizing the concept of the present invention.

Referring to the drawing, FIG. 1 shows a plate member 10 of generally rectangular shape for a cabinet or the like, the member 10 having a plurality of fastening points 12 or points to be utilized for fastening the member 10 to another member, or for fastening another member to the member 10. The plate member 10 is made of thin gauge metal or metal screens which may be utilized to be attached to a non-metallic member or structure of the cabinet.

Figure 2:
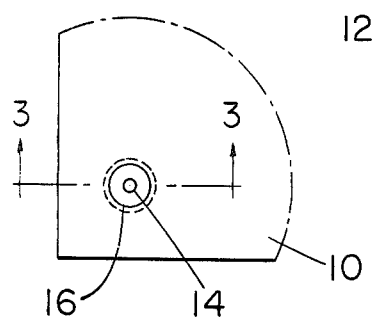
FIG. 2 is an enlarged view of the identified area 2—2 shown in FIG. 1.

FIG. 2 shows an enlarged view of one of the fastening points 12 wherein the metal plate 10 has a hole 14 drilled therethrough and the area around the hole 14 is then formed with a cup-like depression or dimple 16, the size and depth of the dimple 16 depending on the size of the hole 14 and the thickness of the metal plate 10.

Figure 3:
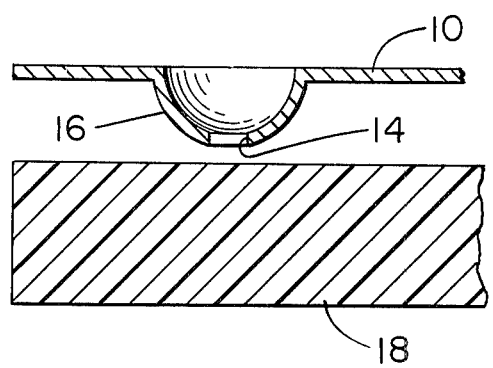
FIG. 3 is an enlarged sectional view, taken on the plane 3—3 of FIG. 2, showing the metal piece placed over the plastic piece prior to bonding of the parts.

In FIG. 3 is shown an enlarged sectional view of the metal plate 10 having the depression 16 surrounding the hole or aperture 14 placed over a non-metallic or plastic piece 18 in preparation for fastening the two pieces 10 and 18 together. The size of the hole or aperture 14 depends also on the usage of the metal plate 10 and the thickness thereof, it being seen that the hole 14 is in the center of the dimple 16.

Figure 4:
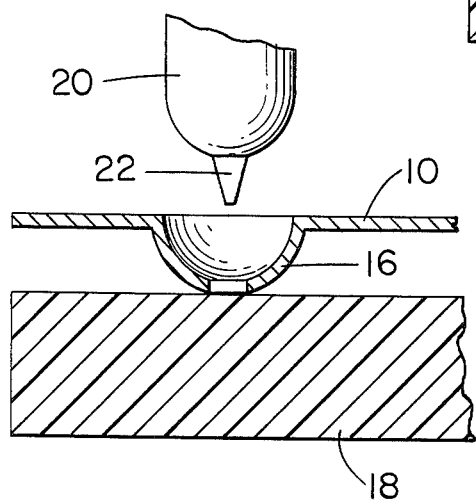
FIG. 4 is a sectional view showing the bonding of the parts together by the ultrasonic tool.

The positions of the two pieces, just prior to bonding thereof, are shown in FIG. 4, the metal plate 10 with the formed dimple 16 therein being placed on the plastic piece 18. An ultrasonic tool 20 has a horn 22 positioned in preparation for fastening the two pieces together.

Figure 5:
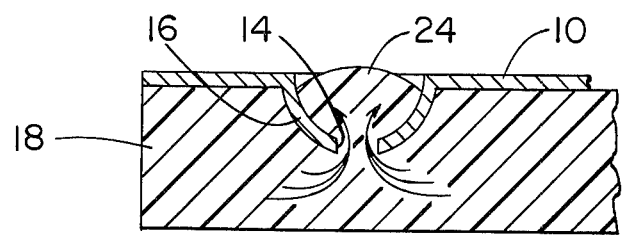
FIG. 5 is a sectional view showing the parts bonded together.

In FIG. 5 are shown the two parts bonded together with the metal plate 10 against the surface of the plastic piece 18, the dimple 16 being embedded in the plastic piece, and showing the flow of plastic through the hole 14 to form a filler portion 24 to hold the two parts together by means of the flow of softened plastic material through the aperture 14, as indicated by the arrows from the plastic piece 18 into the dimple 16.

The plastic material 18 may be a structural foam material of thermoplastic nature, which material can be easily worked by the energy from the ultrasonic horn 22 which directs its high frequency energy into the dimple area. The dimple acts as an energy concentrator to heat the plastic material and cause the softened plastic material to flow in a softened state through the hole 14 and into the dimple 16 of the metal piece 10 as the dimple is placed or pressed into the plastic material 18. Upon cooling of the parts, of course, the bond between the plastic piece 18 and the metal piece 10 is completed. The metal piece 10 may be in the form of a sheet metal plate or a perforated metal screen plate, as examples of the make-up of such metal piece.

It is thus seen that herein shown and described is a method of bonding or fastening a metal piece 10 and a plastic piece 18 together wherein the metal piece is worked and formed to provide a form for receiving the energy from the ultrasonic horn and cause the energy to be concentrated in a manner which causes the plastic material to be softened and to flow into the metal formed piece and permits the metal plate to be fastened to the plastic material. The method enables the accomplishment of the objects and advantages mentioned above, and while only one embodiment of the invention has been disclosed herein, variations thereof beyond those herein mentioned may occur to those skilled in the art. It is contemplated that all such variations not departing from the spirit and scope of the invention hereof are to be construed in accordance with the following claims.

What is claimed is:

1. A method of bonding a metallic member to a non-metallic member comprising the steps of:
    providing an aperture in said metallic member,
    working the metallic member in the area adjacent said aperture to form a depression therearound,
    placing the depression of said metallic member in contact with the surface of said non-metallic member, and
    sonically heating a portion of said non-metallic member adjacent the depression to cause the material of said portion to soften and to flow through said aperture into said depression.

2. The method of claim 1 wherein the step of working the area adjacent the aperture provides a cup-like depression in said metallic member.

3. The method of claim 1 wherein the step of sonically heating a portion of said non-metallic member provides for concentrating the heat in the depression of the metallic member.

4. A method of securing a metallic piece to a non-metallic piece comprising the steps of:
    providing a hole in said metallic piece,
    forming a depression in the metallic piece about said hole,
    placing the depression in contact with the surface of said non-metallic piece, and
    sonically vibrating a portion of the non-metallic piece adjacent the depression to cause heating thereof thereby softening said portion for flow of material through said hole and into said depression.

5. The method of claim 4 wherein the step of forming a depression about said hole provides a cup-like shape in said metallic piece.

6. The method of claim 4 wherein the step of sonically vibrating a portion of the non-metallic piece provides for concentrating the vibrating energy in the depression of the metallic piece.

7. A method of fastening dissimilar material parts, one being a metallic part and the other being a non-metallic part, comprising the steps of:
    providing a hole in said metallic part,
    dimpling the metallic part in the area surrounding the hole to form a cup-like depression in the metallic part,
    placing the depression of the metallic part in contact with the surface of the non-metallic part, and
    providing ultrasonic energy for causing heating of a portion of the non-metallic material adjacent the depression whereby said portion is softened to flow through said hole and into said depression.

8. The method of claim 7 wherein the step of providing ultrasonic energy includes concentrating the energy in the depression of the metallic part.

9. A method of securing a sheet metal piece to a thermoplastic piece, comprising the steps of:
    providing a plurality of holes in said sheet metal piece,
    forming a curved depression around each of said holes in said sheet metal piece,
    placing the curved depressions in contact with the surface of said thermoplastic piece,
    sonically heating the portion of said thermoplastic piece for softening thereof adjacent the holes in said sheet metal piece, and
    pressing the curved depression into said softened portion of said thermoplastic material to cause the softened portion to flow through said holes and into said curved depression.

10. The method of claim 9 wherein the step of sonically heating the portion of the thermoplastic piece provides for concentrating the heating in the curved depression for softening the thermoplastic material adjacent thereto.

* * * * *